(12) United States Patent
Farnham

(10) Patent No.: US 10,517,100 B2
(45) Date of Patent: Dec. 24, 2019

(54) RADIO RESOURCE ALLOCATION IN A WIRELESS COMMUNICATION NETWORK

(71) Applicant: KABUSHIKI KAISHA TOSHIBA, Tokyo (JP)

(72) Inventor: Timothy David Farnham, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/505,341

(22) PCT Filed: Dec. 8, 2014

(86) PCT No.: PCT/GB2014/053636
§ 371 (c)(1),
(2) Date: Feb. 21, 2017

(87) PCT Pub. No.: WO2016/092240
PCT Pub. Date: Jun. 16, 2016

(65) Prior Publication Data
US 2017/0265201 A1    Sep. 14, 2017

(51) Int. Cl.
*H04W 72/08* (2009.01)
*H04W 72/04* (2009.01)
(Continued)

(52) U.S. Cl.
CPC ......... *H04W 72/082* (2013.01); *H04W 16/14* (2013.01); *H04W 72/048* (2013.01);
(Continued)

(58) Field of Classification Search
CPC ... H04W 72/08; H04W 72/082; H04W 72/04; H04W 72/048; H04W 72/0446;
(Continued)

(56) References Cited

U.S. PATENT DOCUMENTS 6,636,736 B1 * 10/2003 Billon .................. H04W 16/02
                                                                370/328
6,654,612 B1 * 11/2003 Avidor ................. H04W 72/02
                                                                455/447

(Continued)

FOREIGN PATENT DOCUMENTS

EP    2 001 176 A2    12/2008
EP    2 141 945 A2    1/2010
(Continued)

OTHER PUBLICATIONS

International Preliminary Report on Patentability and Written Opinion issued by The International Bureau of WIPO dated Jun. 22, 2017, for International Application No. PCT/GB2014/053636.
(Continued)

*Primary Examiner* — Sulaiman Nooristany
(74) *Attorney, Agent, or Firm* — Finnegan, Henderson, Farabow, Garrett & Dunner, L.L.P.

(57) ABSTRACT

Radio resource allocation is carried out on the basis of a radio environment map. The radio environment map is constructed based on received reports of signal quality and/or strength. Using history and triangulation, estimates of station positions can be determined, and expectations can be determined for interference between stations and between stations and access points. Resource requests can then be fulfilled on the basis of separate treatment of requests which have little potential for causing interference, and those which have potential to cause interference.

15 Claims, 14 Drawing Sheets

(51) Int. Cl.
*H04W 16/14* (2009.01)
*H04W 84/18* (2009.01)

(52) U.S. Cl.
CPC ... *H04W 72/0446* (2013.01); *H04W 72/0453* (2013.01); *H04W 84/18* (2013.01)

(58) Field of Classification Search
CPC ......... H04W 72/0453; H04W 72/0406; H04W 72/0426; H04W 72/044; H04W 72/085; H04W 72/1226; H04W 72/1263; H04W 16/14; H04W 16/32; H04W 16/04; H04W 84/18; H04W 84/045
See application file for complete search history.

(56) References Cited

U.S. PATENT DOCUMENTS

| | | | | |
|---|---|---|---|---|
| 9,265,048 | B2* | 2/2016 | Sampath | H04W 72/082 |
| 9,462,601 | B1* | 10/2016 | Zhou | H04W 72/1226 |
| 2007/0104164 | A1* | 5/2007 | Laroia | H04W 24/08 370/338 |
| 2007/0140168 | A1* | 6/2007 | Laroia | H04W 24/08 370/330 |
| 2007/0173198 | A1* | 7/2007 | Kim | H04W 72/06 455/63.1 |
| 2009/0069023 | A1* | 3/2009 | Ahn | H04L 5/0007 455/450 |
| 2009/0247166 | A1* | 10/2009 | Luo | H04W 72/082 455/436 |
| 2009/0268684 | A1* | 10/2009 | Lott | H04W 72/087 370/329 |
| 2010/0151894 | A1* | 6/2010 | Oh | H04W 72/082 455/509 |
| 2011/0019622 | A1* | 1/2011 | Lee | H04L 5/0007 370/328 |
| 2011/0075628 | A1* | 3/2011 | Cho | H04W 72/0413 370/329 |
| 2011/0292890 | A1* | 12/2011 | Kulkarni | H04W 72/0426 370/329 |
| 2011/0294514 | A1* | 12/2011 | Kulkarni | H04W 72/0426 455/450 |
| 2012/0026940 | A1* | 2/2012 | Barbieri | H04L 5/0032 370/328 |
| 2012/0127878 | A1* | 5/2012 | Kim | H04W 74/002 370/252 |
| 2012/0257585 | A1* | 10/2012 | Sydor | H04W 72/082 370/329 |
| 2013/0010634 | A1* | 1/2013 | Lim | H04W 72/085 370/252 |
| 2013/0065621 | A1* | 3/2013 | Chang | H04W 84/18 455/500 |
| 2014/0024388 | A1* | 1/2014 | Earnshaw | H04W 72/02 455/452.2 |
| 2014/0119319 | A1* | 5/2014 | Manssour | H04W 72/082 370/329 |
| 2014/0162585 | A1* | 6/2014 | Bose | H04W 16/14 455/404.1 |
| 2014/0274104 | A1* | 9/2014 | Amanna | H04W 16/14 455/454 |
| 2015/0249530 | A1* | 9/2015 | Zhang | H04L 5/0058 370/329 |
| 2015/0263844 | A1* | 9/2015 | Kinnunen | H04L 5/0073 370/330 |
| 2015/0264652 | A1* | 9/2015 | Zhang | H04W 52/143 455/522 |
| 2015/0305004 | A1* | 10/2015 | Ohta | H04W 16/04 370/330 |
| 2015/0334719 | A1* | 11/2015 | Wang | H04L 1/00 370/329 |
| 2015/0358976 | A1* | 12/2015 | Rahman | H04W 72/082 370/280 |
| 2015/0382361 | A1* | 12/2015 | Sabapathi | H04W 72/082 370/329 |
| 2016/0174242 | A1* | 6/2016 | Fujishiro | H04B 17/24 455/452.2 |
| 2016/0226534 | A1* | 8/2016 | Suzuki | H04J 11/0053 |
| 2017/0280461 | A1* | 9/2017 | Zhang | H04W 72/082 |

FOREIGN PATENT DOCUMENTS

| | | |
|---|---|---|
| EP | 2 540 126 B1 | 5/2018 |
| JP | 2014-204414 A | 10/2014 |
| WO | WO 03/001742 A1 | 1/2003 |
| WO | WO 2012/037990 A1 | 3/2012 |

OTHER PUBLICATIONS

Bosisio, R., et al., "Interference Coordination vs. Interference Randomization in Multicell 3GPP LTE System," IEEE, WCNC Proceedings, pp. 824-829 (2008).

Muller, A., et al., "Cooperative Interference Prediction for Enhanced Link Adaptation in the 3GPP LTE Uplink," IEEE (2010), 5 pages.

Galindo-Serrano, A., et al. "Harvesting MDT Data: Radio Environment Maps for Coverage Analysis in Cellular Networks," 8*th* ICS CrownCom, pp. 37-42 (2013).

* cited by examiner

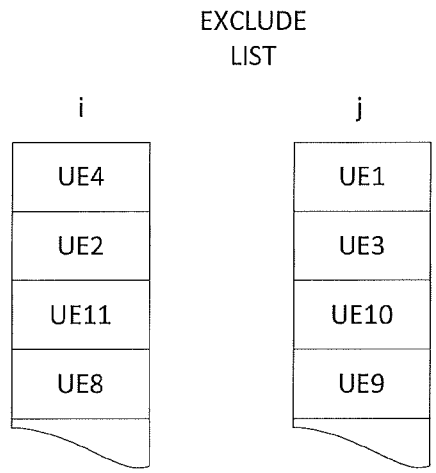
FIGURE 13
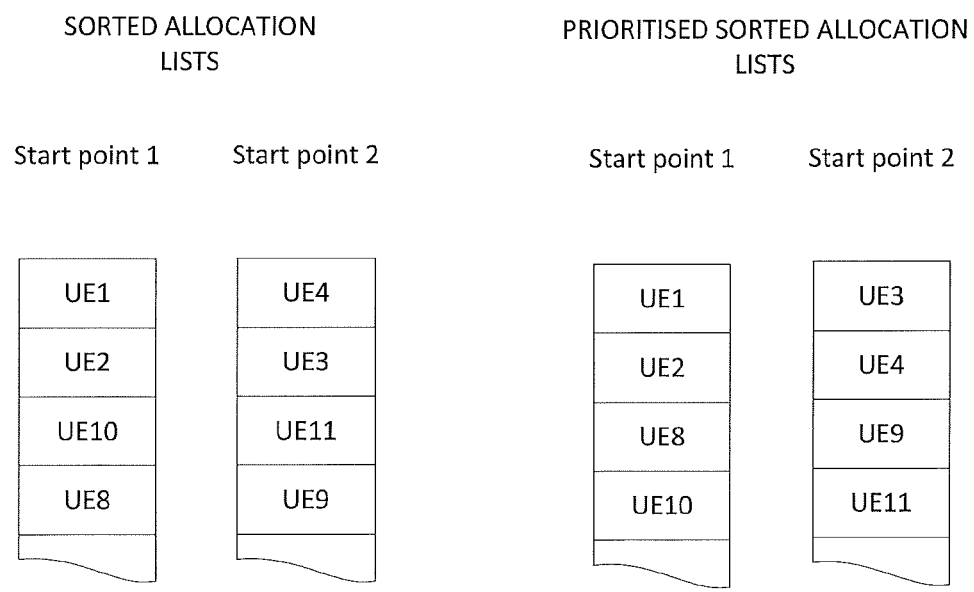
FIGURE 14
FIGURE 15

RADIO RESOURCE ALLOCATION IN A WIRELESS COMMUNICATION NETWORK

FIELD

Embodiments described herein relate to radio resource allocation in wireless communications networks.

BACKGROUND

Radio resource allocation is a process which is employed to manage finite radio resource in an environment in which a wireless communications network is established. In a cellular paradigm, radio resource allocation aims to take account of likely interference impact of adjacent cells, when allocating radio resource. In opportunistic or ad hoc paradigms, gathering information to enable effective radio resource allocation is equally if not more important.

BRIEF DESCRIPTION OF THE DRAWINGS

FIG. 13 illustrates example lists produced and maintained by the list update process of FIG. 11;

FIG. 14 illustrates sorted allocation lists generated from the lists of FIG. 13;

FIG. 15 illustrates prioritised sorted allocation lists generated from the lists of FIG. 13.

DETAILED DESCRIPTION

Figure 1:
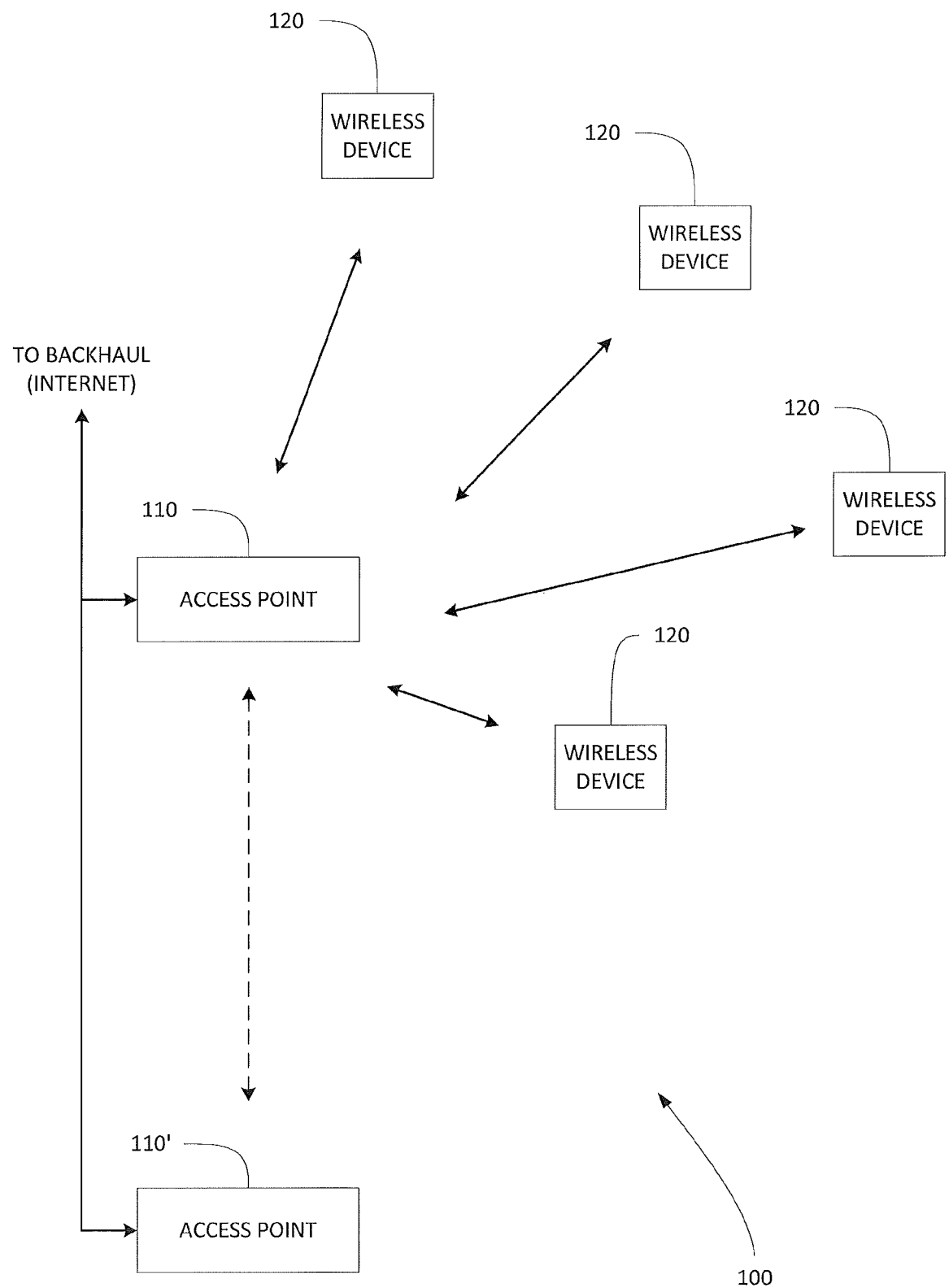
FIG. 1 is a schematic representation of a wireless communications network.

A wireless communications network is illustrated in FIG. 1.

In general terms, the embodiment employs a Radio Environment Map (REM), to proactively estimate interference in dense small cell deployments. Embodiments described herein achieve full frequency reuse, i.e. a factor of 1. Embodiments described herein could also exploit white space spectrum opportunities.

The REM approach, as described in relation to the embodiments, uses a measurement based prediction model of the radio environment in order to estimate the interference to neighbours.

Conceptually, REM is based on collecting radio related measurements in order to build a statistical map for making radio environment predictions. Dynamic REM (DREM) is considered to be a REM that can perform predictions in short time periods (i.e. at seconds or sub-second resolutions). The DREM approach, used by embodiments described herein, involves an access point performing estimation of interference signal levels, assuming no prior knowledge of the locations of stations capable of communicating with that access point, or locations of other access points.

The approach then uses these estimates in order to make predictions of the interference levels caused to neighbouring devices. In order to do this, the embodiments make use of received signal power measurements received from participating stations. For example, if the technology specified in the LTE standard is employed, an access point (HeNB) could employ the Reference Signal Received Power (RSRP) measurements reported by UEs. Locations of neighbouring access points are estimated using several accumulated received signal power measurements taken at different positions.

The described approach does not need prior knowledge of the locations of devices that are deployed. That is, the approach does not rely on position information which could, for instance, be gathered from GPS facilities integrated into devices. While many devices now have such facilities, users may deactivate such facilities for privacy or power consumption reasons, or the facilities may not be available in certain environment (such as indoors).

Instead, the approach employed by embodiments described herein relies on the collection of measurements made at devices, and makes SIR predictions based on those measurements. The examples disclosed herein make REM predictions of SIR based on RSRP and/or MDT reports, in the context of an LTE based implementation.

The measurements are accumulated to determine the radio environment. These predictions are used in a constraint policy to determine conflicts. The conflicts are avoided by "excluding" them in a process of assigning radio resource blocks to particular stations in the network.

Operationally, a characteristic of embodiments described herein is the manner in which the REM is used to collect the measurements in order to make predictions without using location information. Another characteristic is the way in which excluded resource assignments are applied, using the "conflicts" detected by REM SIR estimation. Exclusion is achieved using a sequential "order" of resource block selection. The following description of embodiments will set out an example of a way in which the "order" can be deduced (using the information from REM) and then used to avoid interference.

The coordinated scheduling scheme of the described embodiments uses the REM predictions of the UE and HeNB SIR (in the context of an LTE implementation) to coordinate RB allocation that attempts to avoid interference. In this approach, interference avoidance is achieved by allocating RBs sequentially as well as avoiding conflicting RB allocations. A SIR threshold (SIRT) is applied to the predicted SIR levels in order to determine whether unacceptable interference may occur. It is also assumed that retransmissions and DL traffic take priority.

In this scheduling approach the REM user obtains SIR estimates and uses this for restricting the RB scheduling through a constraint policy which identifies the excluded RBs based on these SIR predictions.

The result of the constraint policy, as laid out in the described embodiments, is the identification of conflicts, which are then assigned resources using the EXCLUDE order in an opposite sequential direction to the normal order, with the direction determined by the respective indices, for instance, with i<j ascending and i>j descending.

Accordingly, FIG. 1 illustrates a typical wireless communications network 10, including an access point 110 and numerous wireless communications devices 120. A neighbouring access point 110' is also illustrated.

Expected lines of communication are indicated by solid arrows. The access points 110, 110' provide connection facilities to a wider network (typically referred to as "backhaul"), for example to access communications facilities such as the internet. This can be by, for instance, a physically wired network, such as telephone networks or cable networks, power line communication or fibre optics, or by wireless communications media.

The present example is concerned with the manner in which the access point 110 manages the allocation of radio resource in establishing communication with the wireless devices 120.

Figure 2:
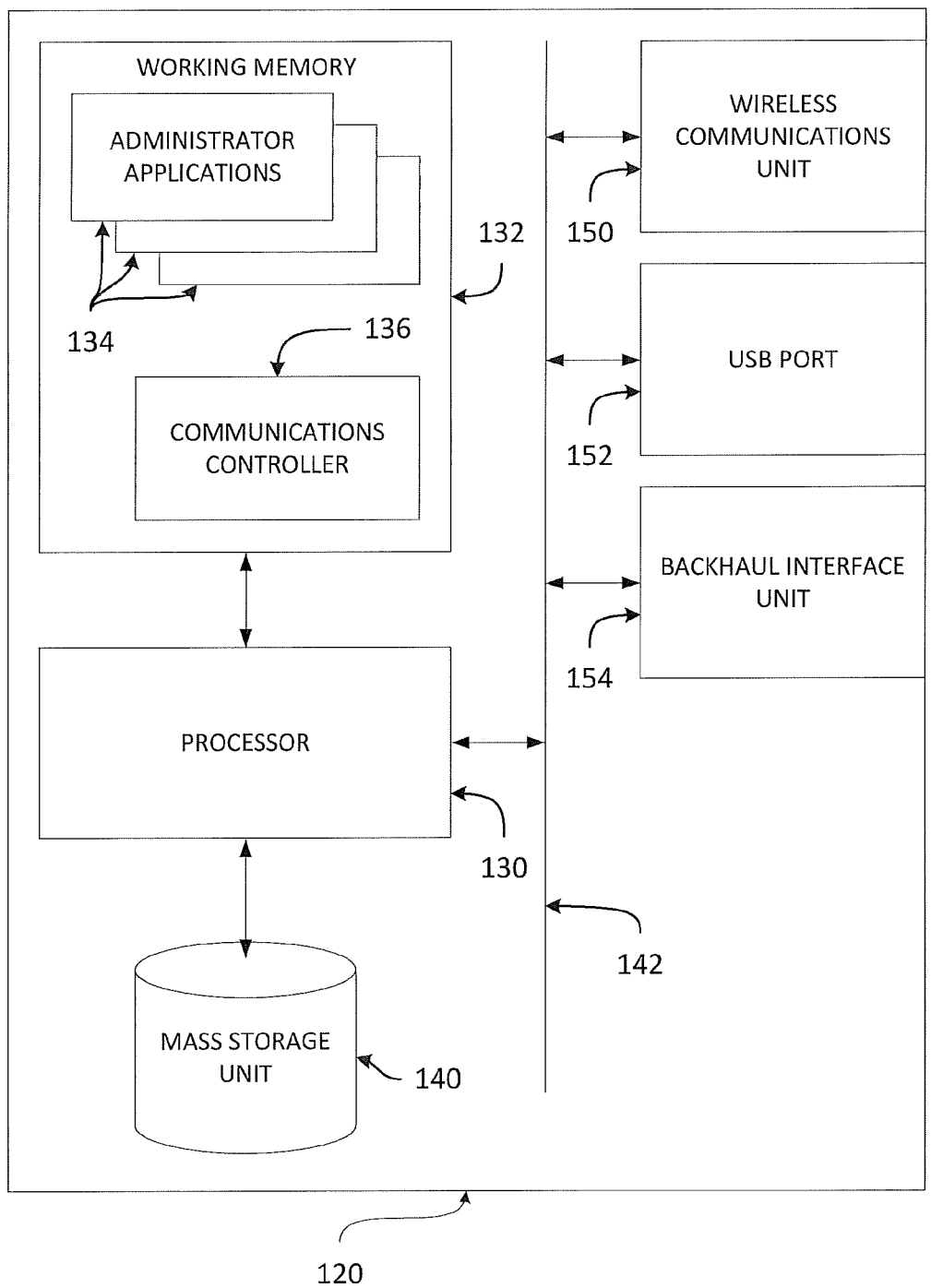
FIG. 2 is a schematic representation of an access point in accordance with a described embodiment.

As shown in FIG. 2, the access point 110 is a relatively generic computing device, configured by specific software to implement the described embodiment. To that end, the access point 110 comprises a processor 130 operable to execute computer executable instructions presented to it. A working memory 132 (which would normally comprise volatile and non-volatile memory components) stores program components, such as administrator applications 134 for use by an administrator of the access point and other operating programs, in particular, a communications controller 136 configuring the access point 120 in accordance with the described embodiment.

A mass storage unit 140 provides bulk data and program storage facilities—normally, mass storage comprises a high volume storage medium which may have relatively slow access speed, certainly in relation to the working memory 132, and the processor 130 will access data and code stored in the mass storage unit 140 as required, usually storing the same in the working memory 132 for rapid access for convenience.

A bus 142 provides access by the processor 130 to other components of the access point 120. In particular, a wireless communications unit 150 is effective to establish radio frequency communication with other devices, in a predetermined band of frequencies specified by a technical standard. In this example, the LTE standard is employed, but the reader will appreciate that this is not essential to an appreciation for the present disclosure.

A USB port 152 enables connection of the access point 120 to another device, such as a PC based computer, such as to enable wired connection to the services offered by the access point 120 or to enable configuration and control thereof.

A backhaul interface unit 154 enables connection of the access point to a backhaul facility, such as a cable modem or a telephone line, so that the access point 120 can access facilities offered on such a backhaul installation, for example internet based services.

Figure 3:
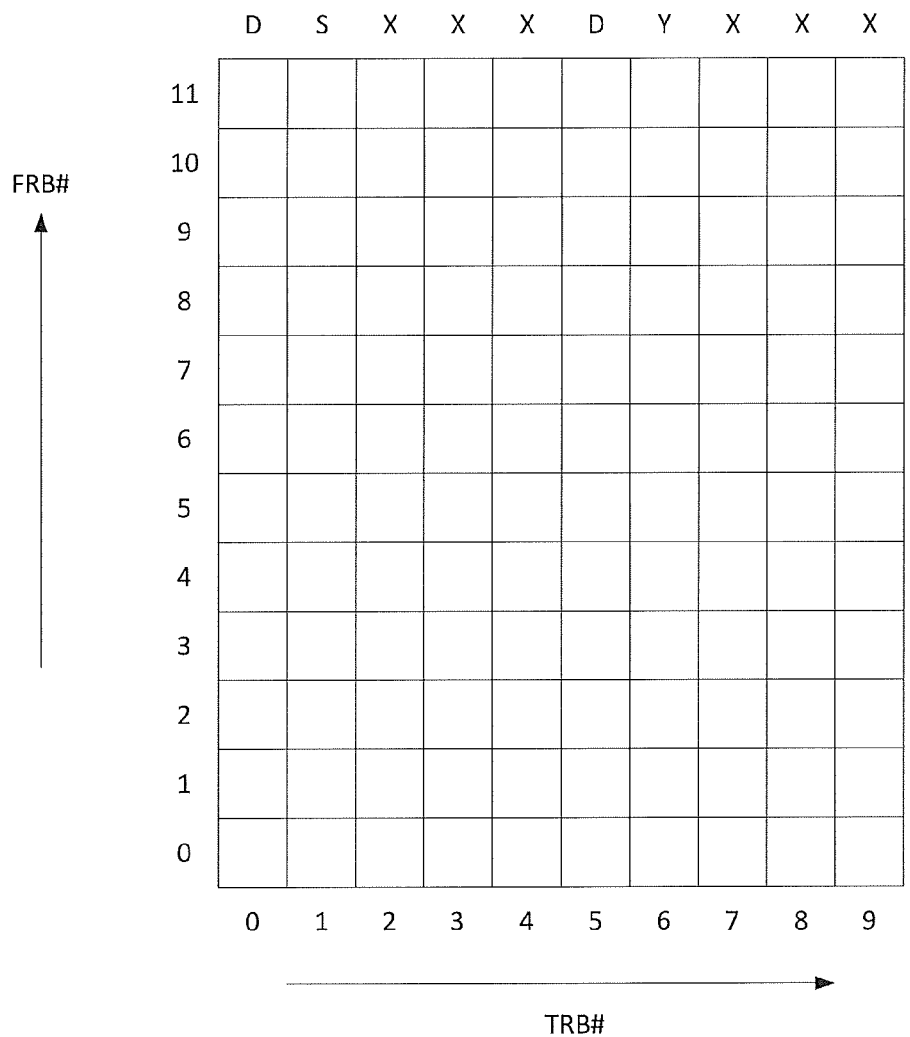
FIG. 3 is a graphical representation of a resource block of a communications channel defined in the network.

FIG. 3 is a representation of the LTE radio frame illustrating resource block structure in TDD (time division duplex) mode. It illustrates the resource available for allocation by the access point.

As illustrated, each radio frame is a two-dimensional array of resource blocks defined by ten subframes (denoted TRB #), numbered from 0 to 9, covering twelve frequency subcarriers (FRB #) numbered from 0 to 11.

Within the radio frame, resource blocks in subframes TRB0 and TRB5 are reserved for downlink (denoted 'D'), while resource blocks in subframes TRB1 and TRB6 are reserved for synchronisation (denoted 'S').

Each frame is composed of ten subframes, each of which comprise two slots. A resource block is denoted by reference to a slot of a subframe TRB #, carried across the 12 subcarriers FRB #. Within a resource block, resource elements are defined, within which symbols can be transmitted.

Allocation of these resource blocks as uplink or downlink (except for the reserved resource blocks, as detailed above) is the responsibility of the access point. This allocation is established by way of a process whose architecture is illustrated in FIG. 4.

Figure 4:
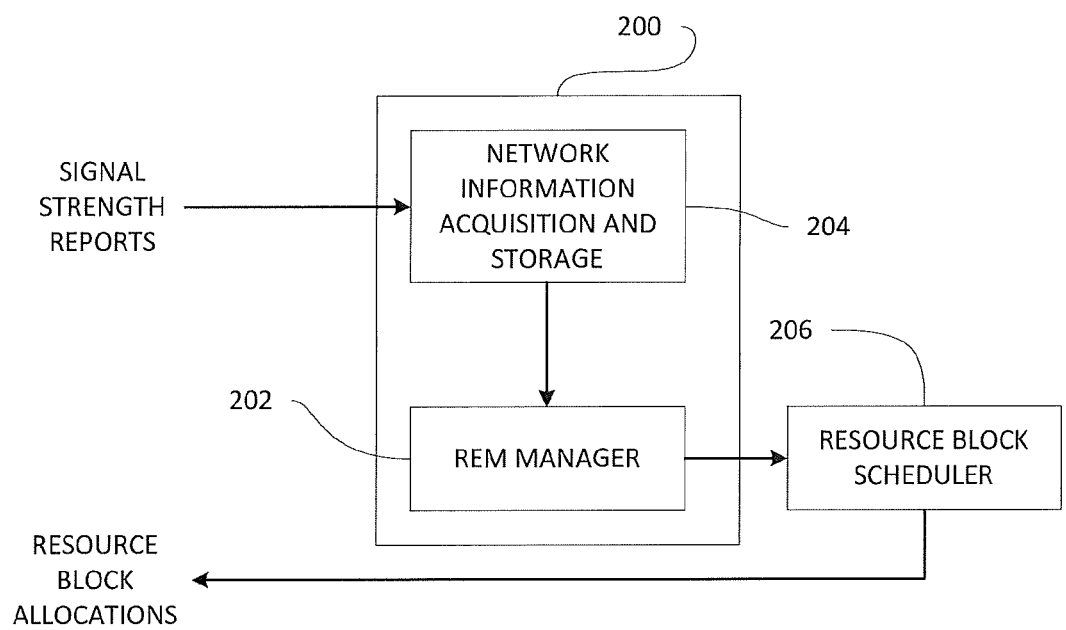
FIG. 4 is a schematic representation of a resource allocation coordination manager of the access point of FIG. 3.

In the embodiment illustrated in FIG. 4, a resource allocation coordination manager 200 is implemented, for example by firmware or software, including a network information acquisition and storage facility 204 able to gather and store report from stations 130 in the network. Then, an REM manager 202 is operable to process the acquired and stored information, to obtain a radio environment map (REM). The estimated SIR is then passed to a resource block scheduler 206 which generates resource block allocation messages back to the stations 130.

Figure 5A:
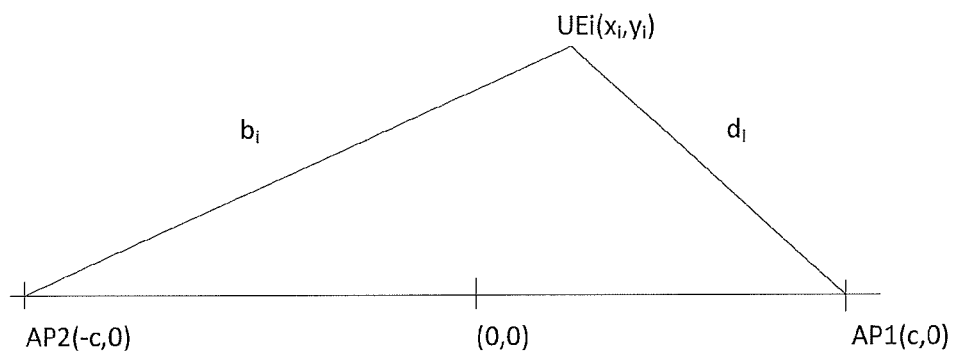
FIGS. 5a and 5b are schematic geometrical representations of station position examples to aid in understanding of operation of the described embodiment.

Each station 130 reports to the access point 120 on received signals attributable to other stations and access points in the network. For example, in LTE, each station 130 reports Reference Signal Received Power (RSRP) measurements. From this information, candidates can be determined for predictions of signal to interference ratios for signals received around the network. FIG. 5a illustrates a simple example of this, for a situation where a station (with index i) is positioned at a position with coordinates $(x_i, y_i)$ and another (with index j) at $(x_j, y_j)$ can be in receipt of signals from two access points (with indices 1 and 2 respectively). The two access points are positioned with coordinates (−c,0) and (c,0), respectively, on a nominal two dimensional reference frame. The reader will appreciate that a two dimensional reference frame is used here, but that this analysis would be extendable to a three dimensional reference frame without difficulty.

As shown in FIG. 5a, $b_i$ and $d_i$ represent distance between the station at $(x_i, y_i)$ and the respective access points. RSRP levels are collected by the station for signals received from the two access points, these levels are denoted $z_{1,i}$ and $z_{2,i}$ respectively. The quantity c is the separation between the access points and a midway reference point (0,0).

A working assumption in this analysis is that this midway point is that point where the same RSRP would be received from each access point (assuming equal transmit power). The validity of this assumption could be tested with accumulation of data over time.

Thus, the location of the station can be computed as follows:

$$b_i = \sqrt{y_i^2 + (c+x_i)^2} \text{ and } d_i = \sqrt{y_i^2 + (c-x_i)^2}$$

Assuming $b_i/c = r_i$ and $d_i/c = s_i$;
then $$x_i = \frac{c(r_i^2 - s_i^2)}{4} \text{ and}$$

-continued $$y_i = c\sqrt{s_i^2 - \left[1 - \frac{(r_i^2 - s_i^2)}{4}\right]^2}$$

where $r_i$ and $s_i$ are defined as relative distances from the respective access points to the station, as a ratio to half the access point separation c, which is estimated by determining the midway reference point (0,0), where the measured signal levels are $z_{0,i}$.

This is useful, as the evaluation of $r_i$ and $s_i$ does not require absolute measurements, but rather as ratios, respectively, of $z_{1,i}$ and $z_{2,i}$ to $z_{0,i}$. Further, if the measured signal levels are reported on a logarithmic scale, then ratios are re-expressed as differences, and the computational effort required to derive $r_i$ and $s_i$ is further eased, so:

10α log($r_i$)=$z_{1,i}$-$z_{0,i}$ and

10α log($s_i$)=$z_{2,i}$-$z_{0,i}$

In each of these cases, no knowledge is required of the transmit powers of the access points. α is a path loss exponent. This can be estimated by numerical methods as more data is collected, although it may also be possible to start with a working assumption based on past experience.

From this analysis, it therefore follows that the download Signal to Interference Ratio (SIR), at any station (UEi) for a signal from one access point (AP1) interfered by a signal from another access point (AP2), is given by:

HeNB SIR$_{1,2}$=10α log($b_i/d_i$)=10α log($r_i/s_i$)=$z_{1,i}$-$z_{2,i}$ and evidently vice versa by:

HeNB SIR$_{2,1}$=10α log($d_i/b_i$)=10α log($s_i/r_i$)=$z_{2,i}$-$z_{1,i}$ where i denotes the index of the station (UE).

Figure 5B:
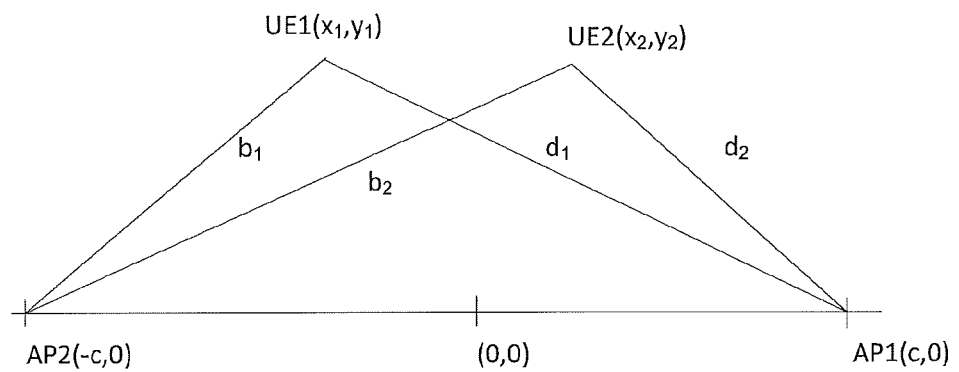

Likewise for any two selected UE locations (i.e. denoted by index 1 and 2 associated with AP1 and AP2 respectively), as shown in FIG. 5b, the expression for the uplink SIR resulting from the signal from one UE (UE2) on the signal from another (UE1) is given by:

UL SIR$_{1,2}$=10α log($d_2/d_1$)=10α log($s_2/s_1$)=$z_{2,2}$-$z_{2,1}$ and evidently vice versa by:

UL SIR$_{2,1}$=10α log($b_1/b_2$)=10α log($r_1/r_2$)=$z_{1,1}$-$z_{1,2}$

Further, for time division duplex (TDD) communications, it is also important to consider the effect of interference when the uplink and downlink are not aligned. For example, an arrangement could be contemplated where two stations are associated with respective access points and use resource blocks at the same time as the access points. The stations are positioned at points $(x_1, y_1)$ and $(x_2, y_2)$ denoted by UE1 and UE2 respectively. Indexing the distances between the stations and the access points in the same way as is illustrated in FIG. 5b, the SIR for a signal, received at a location UE1 (associated with the AP1), with respect to interference from UE2, is:

$$UE\ SIR_{1,2} = 10\log\alpha\left(\frac{\sqrt{(y_1 \pm y_2)^2 + (x_1 - x_2)^2}}{d_1}\right)$$

$$= 10\log\alpha\left(\frac{\sqrt{(y_1 \pm y_2)^2 + (x_1 - x_2)^2}}{cs_1}\right)$$

Likewise for the SIR for a signal, received at a location UE2 (associated with the AP2), with respect to interference from UE1 is:

$$UE\ SIR_{2,1} = 10\log\alpha\left(\frac{\sqrt{(y_1 \pm y_2)^2 + (x_1 - x_2)^2}}{b_2}\right)$$

$$= 10\log\alpha\left(\frac{\sqrt{(y_1 \pm y_2)^2 + (x_1 - x_2)^2}}{cr_2}\right)$$

Using the equal power assumption, therefore, the reference distance c can be cancelled, implying that the actual positions of access points is not required for this analysis.

The reader will note that the geometric analysis as laid out above can give rise to plural results, because of the dual solutions to quadratic problems, as represented by the use of the ± operator above.

However, this can be resolved over time. It will be appreciated that, in many cases, stations would be expected to move over time, but not so quickly that they cannot be tracked between one measurement opportunity and the next. Using successive reports, the acquisition of information can lead to certain candidate solutions being rejected, as being inconsistent, and for other candidate solutions to be retained in favour. Thus, as time progresses, the resultant radio environment map (REM) will resolve into SIR and station position information with high degrees of confidence associated therewith.

Figure 6:
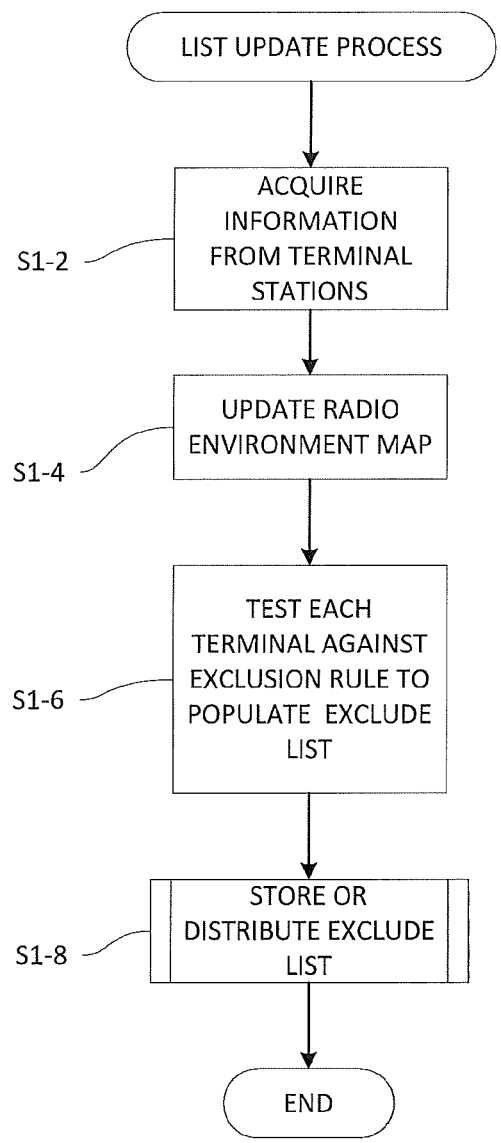
FIG. 6 is a process flow diagram for a list update process of the described embodiment.

FIG. 6 then illustrates a process by which this information, built into a REM, can be harnessed to allocate resource in the wireless communications system 100 in which resource blocks are defined in time and frequency.

Reports are received from time to time from stations 120. In this process, it is assumed that reports are received periodically, but other arrangements may be provided depending on the implementation. In the first step S1-2 of the process, therefore, reports are acquired from each station associated with an access point. These reports, containing signal measurement vectors z (or relative values), are then used, in step S1-4, to update the REM. REM computes the SIR estimates using the data collected from all of the stations 120.

Each access point 110 pair and each station pair 120 is then tested against a rule in step S1-6 and is designated as belonging to one or more EXCLUDE groups on the basis of that test. In this embodiment, a typical rule for each node (denoted i and j) is:

IF {HeNB SIR$_{i,j}$<SIR$_T$} THEN EXCLUDE j

Likewise for each UE 120 pair, denoted (i,j) the typical rule is:

IF {UL SIR$_{i,j}$<SIR$_T$} OR {UE SIR$_{i,j}$<SIR$_T$} THEN EXCLUDE i,j

Alternative rules are:

IF {UL SIR$_{i,j}$<SIR$_T$} OR {UE SIR$_{i,j}$<SIR$_T$} THEN EXCLUDE j

IF {UL SIR$_{i,j}$<SIR$_T$} OR {UE SIR$_{i,j}$<SIR$_T$} THEN EXCLUDE i where the SIRT threshold margin is a constant selected according to the desired target. In one example, SIRT could be 10 dB.

That is, for any acquired SIR statistic or estimate then, if the SIR of that signal pair is lower than the threshold, the corresponding stations are designated within one of the EXCLUDE groups.

Figure 7:
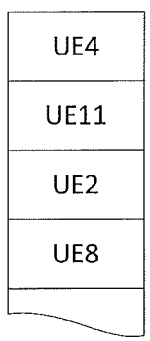
FIG. 7 is an example list of stations produced by the list update process.

Thus, for any access point, its associated terminal stations (UE) may be designated within the EXCLUDE groups. These are expressed, in this embodiment, as lists as set out in FIG. 7. This designation determines the way in which resources are subsequently allocated.

In step S1-8, a routine is called to update, store and if necessary distribute the corresponding station lists designated as EXCLUDE using the above rule. This depends on where the lists are generated, which can be centrally or locally within each access point (REM manager, 202).

Figure 8:
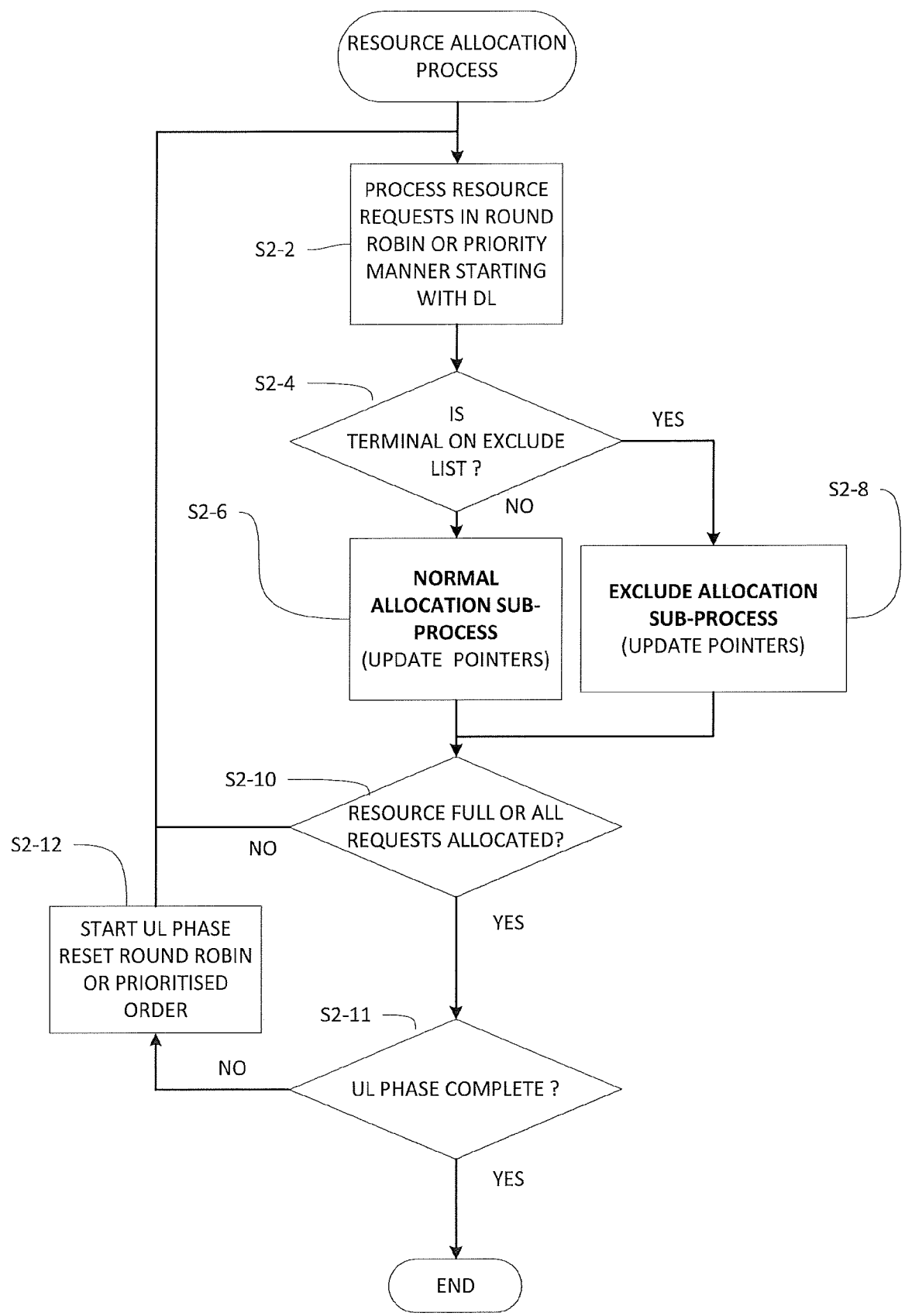
FIG. 8 is a resource allocation process of the described embodiment.
Figure 9:
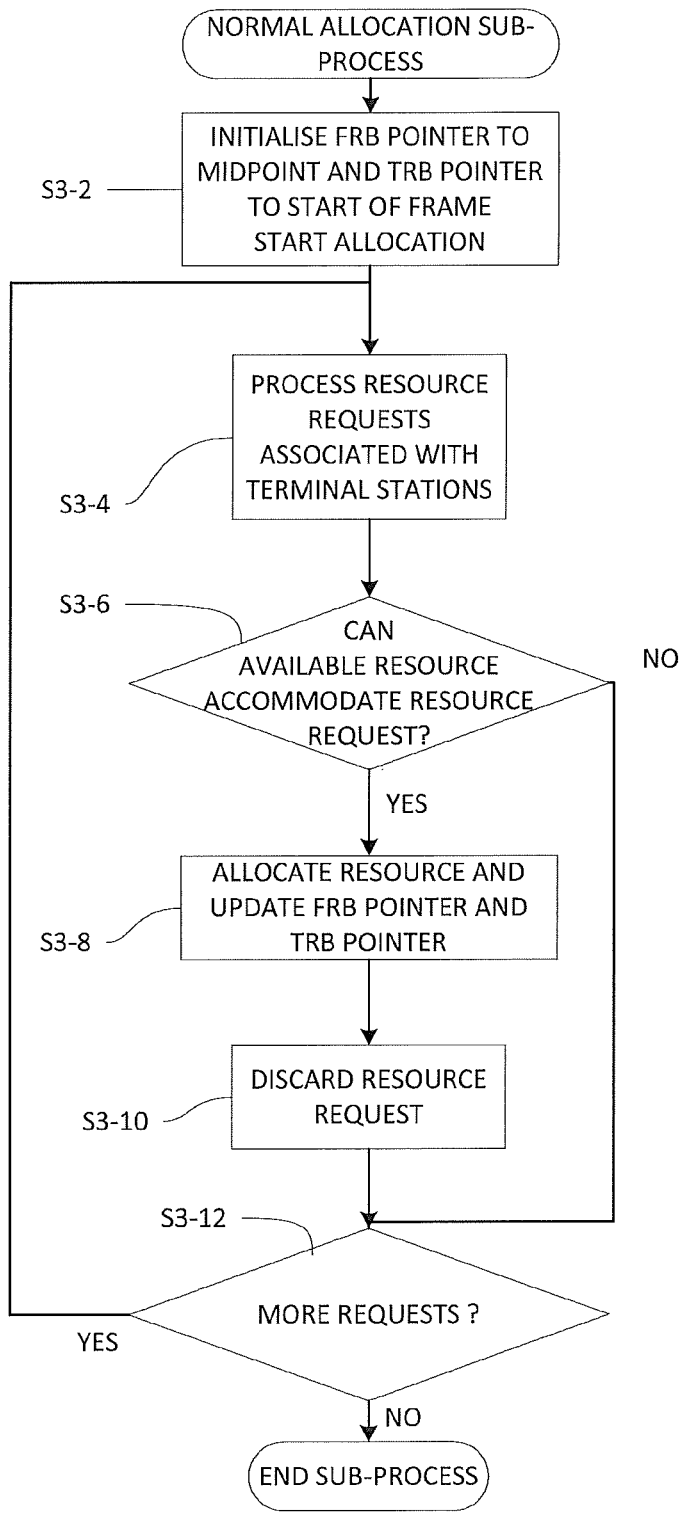
FIG. 9 is a normal allocation sub-process called by the resource allocation process of FIG. 8.

The aforementioned lists in step S1-10 are used in the resource allocation process of each access point, in an independent manner, as illustrated in FIG. 8. In this routine, an initialisation step S2-2 starts the normal round robin processing of resource requests, starting with the downlink (DL). If the selected station is on the excluded list, as determined in step S2-4, the exclude allocation sub process is performed in step S2-8 (according to FIG. 10), otherwise the normal allocation sub process is performed in step S2-6 (according to FIG. 9).

The normal allocation sub process, in step S3-2, initialises corresponding TRB and FRB pointers to the start of the subframe, in time, and at a midway point in frequency respectively. For instance, when there are multiple subframes per frame in time TRB is set to the beginning of the first subframe and resource blocks allocated, in S3-8, in accordance with the requests, in step S3-4, providing the sufficient resources are available, as determined in step S3-6.

Figure 10:
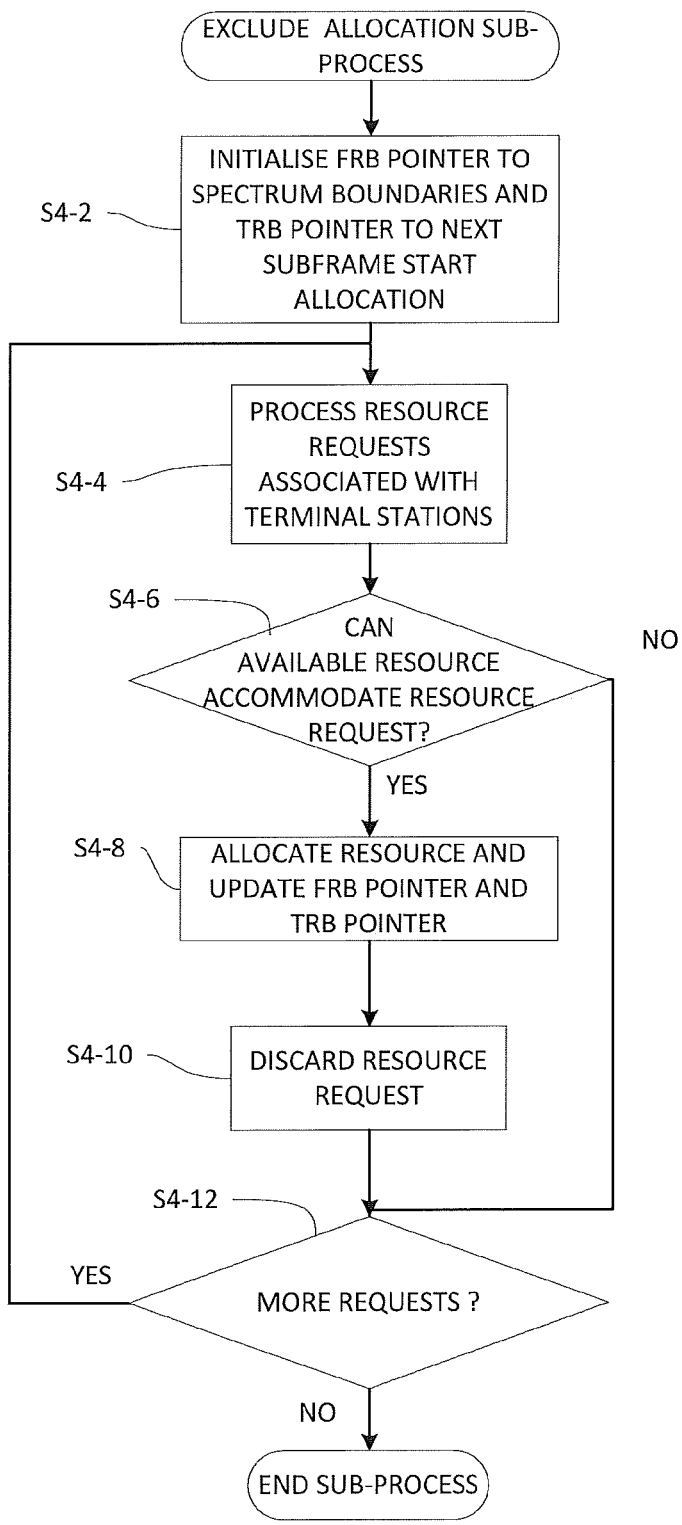
FIG. 10 is an exclude allocation sub-process called by the resource allocation process of FIG. 8.

Likewise, if the request under consideration, in step S2-2, corresponds to a station on the EXCLUDE list, the allocation process called is set out in FIG. 10. In this case, by contrast, the starting point for allocation of resource requests, in step S4-2, is half a frame (i.e. a subframe) and half the frequency bandwidth distant to that in S3-2. This offers improvement of separation of the potential interferers which are contained in the EXCLUDE list. An initialisation step S4-2 implements this on the start of each frame allocation process.

Then, similar to the earlier described procedure, step S4-4 establishes an allocation process by selecting a resource request corresponding to the station on the EXCLUDE list. This resource request is then tested in step S4-6 to determine if it can be fulfilled. If it can, then in step S4-8 the resource is allocated, and the pointers for next allocation are updated. Step S4-10 acts to remove the resource requests once allocated.

Step S4-12 is a check to determine if there are more pending resource requests. If there are, the routine returns to step S4-4 otherwise it terminates.

Following this, and returning to FIG. 8, a step S2-10 determines if the resource blocks are fully allocated or if all resource requests have been dealt with, returning to step S2-2 if this is not the case, or moves to the uplink phase. If the uplink phase has not already been completed, as determined in step S2-11, the process proceeds to the uplink (UL) allocation phase, which is initialised in step S2-12 and thence to step S2-2 as before. Once the uplink phase is complete, the process terminates for that frame.

The reader will appreciate that the resource allocation process laid out above is but one example. The guiding principle, in general terms, is to identify potential interferers using the REM. Then, the EXCLUDE designated resource requests are distinguished, in the resource allocation process to separate, as far as possible, the allocated resource blocks that could cause interference, thereby reducing the possibility of interference.

In the example above, requests are handled in a round robin manner. This may be desirable in some circumstances, but not in others. Therefore, modifications to the above processes may offer different approaches which provide different prioritisation, while also accommodating the above general principle, which remains unchanged.

Figure 11:
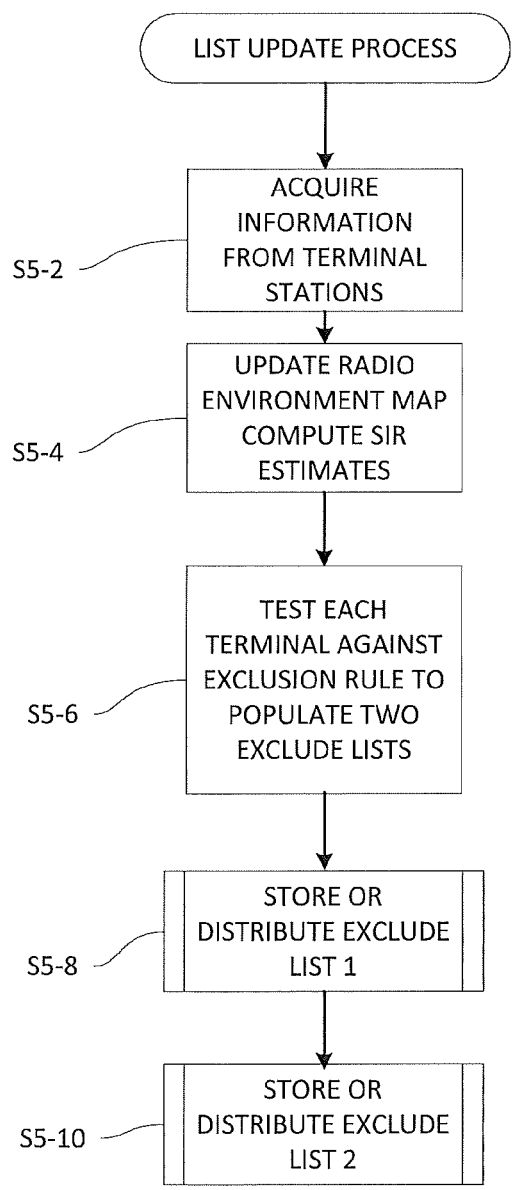
FIG. 11 is a list update process of an alternative embodiment.

For instance, FIG. 11 illustrates a second example of a resource block allocation process. In this example, steps S5-2 and S5-4 are the same as steps S1-2 and S1-4 described above. However, in step S5-6, two EXCLUDE lists are generated. In this case, one EXCLUDE list contains station indexes (i) and the other (j), as depicted in FIG. 13, in which nodes i may suffer interference from nodes j. This enables resources for each pair to be further separated beyond that possible with a single EXCLUDE list. The result of this can best be seen in FIG. 14, which shows the two sorted EXCLUDE lists which correspond to two separate EXCLUDE resource allocation starting points. These starting points are separated further than previously achieved with a single EXCLUDE list, thus providing more certainty in avoiding interference.

This approach can be illustrated schematically as two EXCLUDE lists set out in FIG. 13. For instance with indexes i and j, if i<j it indicates that i should use a start point 1 and j start point 2. Hence, two separate sorted allocation lists are generated from the EXCLUDE lists. The resulting sorted lists are indicated in FIG. 14. The lists can be further sorted based on a priority order (for instance using the index as an example) as indicated in FIG. 15 and used in the final allocation lists.

Figure 12:
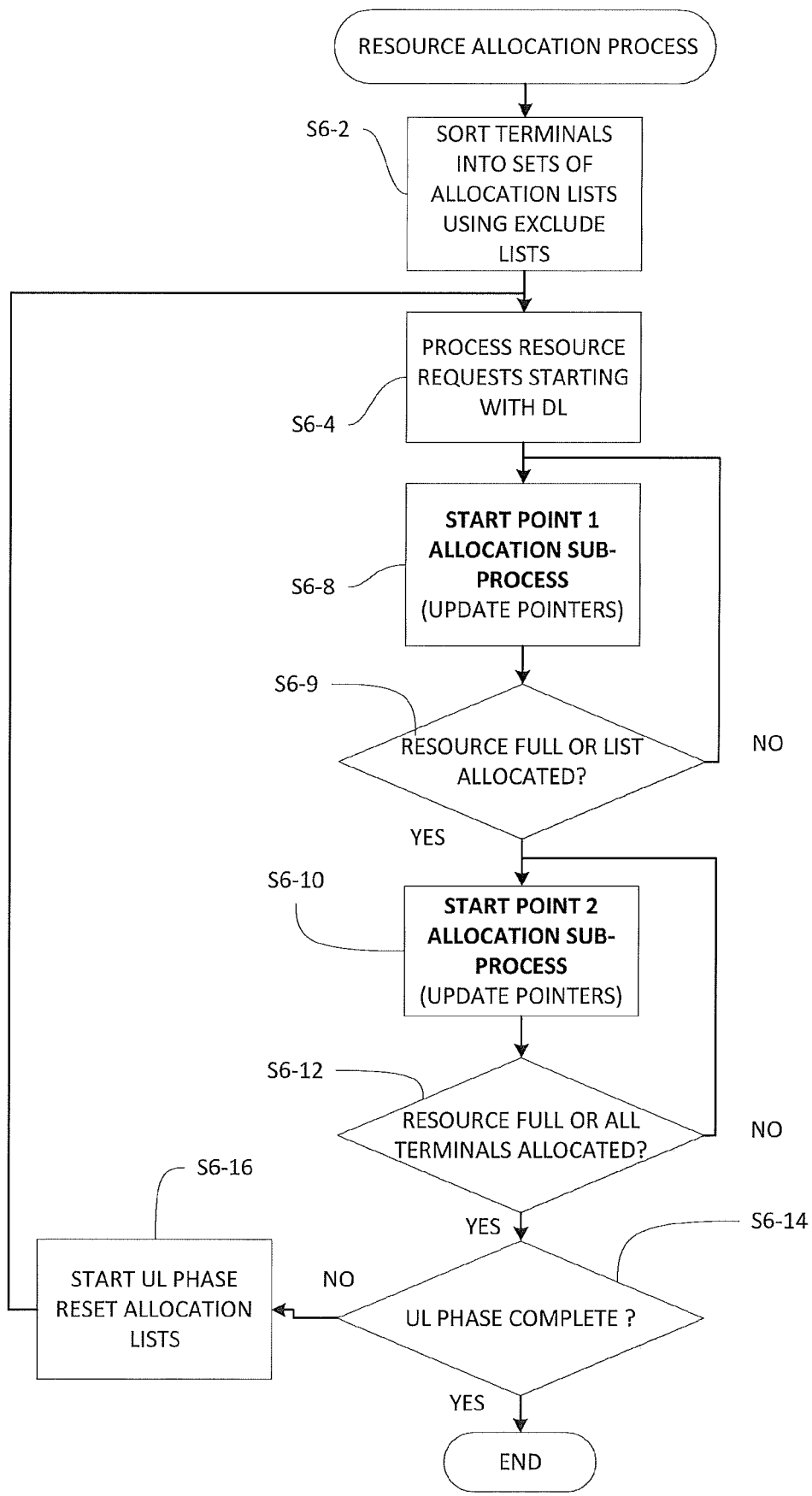
FIG. 12 is a resource allocation process of an alternative embodiment.

Yet a further approach to this resolution of EXCLUDE lists can be understood from a routine set out in FIG. 12. The process commences by sorting the exclude lists into allocation lists, as in FIG. 14 or FIG. 15, in step S6-2. In this routine, an initial step, S6-2, is carried out to resolve the two lists into prioritised sorted lists, as set out in FIG. 15. The principles governing this sort are as follows. Firstly, the priority of requests is respected as an overriding sort criterion for each starting point. For requests with equal priority, if this is possible, the prioritised sort order can be made by the unique station index i and j for the two starting points respectively.

Other sort approaches would equally be possible.

Then, the allocation lists are processed, by selecting each allocation list in turn, starting with the downlink in step S6-4. The first list is designated to starting point 1, and is allocated according to the rules in step S6-8. If there are still resources available and more entries in the list, as determined in step S6-9, the process is repeated. This list is designated to starting point 2, and is allocated according to the rules in step S6-10. If there are still resources available and more entries in the list, as determined in step S6-12, the process is repeated.

After that, the uplink phase is started in step S6-16, if it has not been completed as determined at step S6-14, in an identical manner to the downlink phase.

Figure 16:
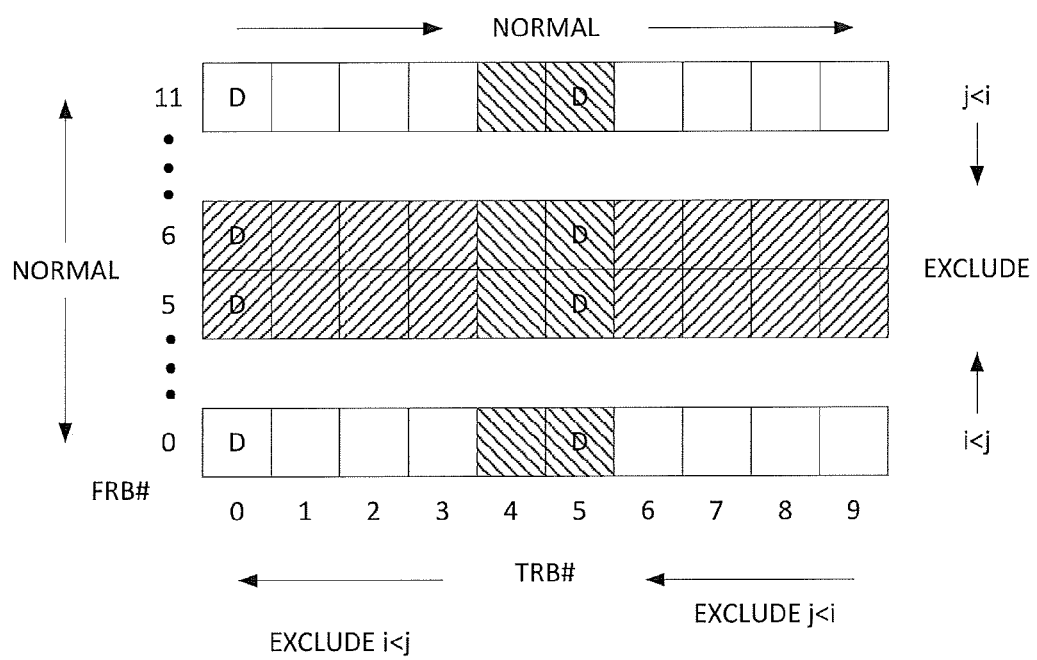
FIG. 16 is a schematic representation of a portion of the resource block, in the course of an allocation process.

FIG. 16 illustrates the contrast between the NORMAL allocation rule and the EXCLUDE allocation rules with two starting points, according to the examples described above. As can be seen, there will be some pre-allocation of resource to downlink communication by the access point, as indicated by shading. Then, if the NORMAL rule is applied, allocation commences from the mid-spectrum point, and from timeslot 0, while in the one EXCLUDE allocation list the starting point is at the end of the first subframe and the lower edge in frequency, while the other starting point is at the end of the second subframe and the upper edge in frequency.

In fact, as the reader will appreciate, the exact scheme of the EXCLUDE allocation rules versus the NORMAL allocation rule is immaterial. It is desirable that they are distinctive, to the extent that the resource allocation on one rule differs from the resource allocation on the other, to reduce the possibility of two resource allocations, of potentially interfering stations, being adjacent to each other. No set of rules will completely eliminate the possibility of interference, unless joint scheduling of all access points is performed, but the presently described approach provides mitigation without the need and complexity of joint scheduling.

While certain embodiments have been described, these embodiments have been presented by way of example only, and are not intended to limit the scope of the inventions. Indeed, the novel methods and systems described herein may be embodied in a variety of other forms; furthermore, various omissions, substitutions, and changes in the form of the methods and systems described herein may be made without departing from the spirit of the inventions. The accompanying claims and their equivalents are intended to cover such forms or modifications as would fall within the scope and spirit of the inventions.

The invention claimed is:

1. Wireless communications apparatus for wireless communications with a plurality of stations over radio resources defined as a plurality of resource blocks, each resource block being bounded by a different finite extent in time and frequency, the wireless communications apparatus comprising:
   at least one processor;
   at least one wireless communications unit coupled to the at least one processor; and
   one or more storage devices, coupled to the at least one processor, storing instructions which, when executed by the at least one processor, causes the at least one processor to:
      receive reports from the plurality of stations via the at least one wireless communications unit, the reports indicating signal strengths of signals received by the plurality of stations, the signals being transmitted by the wireless communications apparatus or the one or more other wireless communications apparatus to the plurality of stations at substantially equal transmit power;
      determine a radio environment map based on possibilities of interference to be caused by the wireless communications with each of the plurality of stations, wherein the possibilities of interference are estimated based on the reports received from the plurality of stations;
      determine, using the radio environment map, whether a pair of the wireless communications apparatus or the one or more other wireless communications apparatus and any of the plurality of stations are potential interferers or not, and designate stations determined to be the potential interferers within an exclude group;
      receive a resource request from any of the plurality of stations via the at least one wireless communications unit, to establish the wireless communications between the wireless communications apparatus and the requesting station;
      discriminate the received resource request in terms of potential interference determined based on whether the requesting station is designated within the exclude group; and
      allocate the plurality of resource blocks in response to the received resource request for the wireless communications with the requesting station by:
         allocating first resource blocks of the plurality of resource blocks if the resource request is discriminated as not being potentially interfering; and
         allocating second resource blocks of the plurality of resource blocks if the resource request is discriminated as being potentially interfering by starting allocation of the second resource blocks at a resource block assigned far in time and/or frequency from a resource block at which the allocation of the first resource blocks starts so as to reduce potential interference by the allocation of the second resource blocks.

2. The wireless communications apparatus according to claim 1, wherein the at least one processor is further configured to determine starting points for allocations of the first and second resource blocks depending on the discrimination of the resource request in order to avoid interference.

3. The wireless communications apparatus according to claim 1, wherein the at least one processor is further configured to determine an order for allocations of the resource blocks.

4. The wireless communications apparatus according to claim 1, wherein the at least one processor is further configured to discriminate a potentially interfering resource request depending on whether a station associated with the resource request is designated within the exclude group.

5. The wireless communications apparatus according to claim 1, wherein the at least one processor is further configured to assign stations interfering each other among a group of potentially interfering stations to one of at least first and second exclude groups, and wherein the at least one processor is further configured to allocate the second resource blocks to resource requests for the first exclude group with priority over resource requests for the second exclude group.

6. The wireless communications apparatus according to claim 5, wherein the at least one processor is further configured to commence allocation of the second resource blocks to resource requests for the first exclude group from a first initial position in the resource blocks, and to commence allocation of the second resource blocks to resource requests for the second exclude group from a second initial position in the resource blocks which is far in time and/or frequency from the first initial position.

7. The wireless communications apparatus according to claim 5, wherein the at least one processor is configured to sort resource requests for each of the first and second exclude groups, and to allocate the second resource blocks to resource requests for each exclude group in sort order.

8. A method of allocating radio resources defined as a plurality of resource blocks in response to resource requests to establish wireless communications between one or more wireless communications apparatus and a plurality of stations, each resource block being bounded by a different finite extent in time and frequency, the method comprising:
   receiving reports from the plurality of stations, the reports indicating signal strengths of signals received by the plurality of stations, the signals being transmitted by the one or more wireless communications apparatus at substantially equal transmit power;
   determining a radio environment map based on possibilities of interference to be caused by the wireless communications with each of the plurality of stations, wherein the possibilities of interference are estimated based on the reports received from the stations;

determining, using the radio environment map, whether a pair of any of the one or more wireless communications apparatus and any of the stations are potential interferers or not;

designating stations determined to be the potential interferes within an exclude group;

receiving a resource request from any of the plurality of stations via the at least one wireless communications unit, to establish the wireless communications between the wireless communications apparatus and the requesting station;

discriminating the resource request in terms of potential interference based on whether the requesting station is designated within the exclude group; and allocating the plurality of resource blocks in response to the received resource request for the wireless communications with the requesting station by:

allocating first resource blocks of the plurality of resource blocks if the resource request is discriminated as not being potentially interfering; and allocating the second resource blocks to the resource request discriminated as being potentially interfering by starting allocation of the second resource blocks for the potentially interfering resource request at a resource block assigned far in time and/or frequency from a resource block at which allocation of the first resource blocks for the not potentially interfering resource request starts so as to reduce potential interference by the allocation of the second resource blocks to the potentially interfering resource request.

9. The method according to claim 8 further comprising determining starting points for allocations of the first and second resource blocks depending on the discrimination of the resource request in order to avoid interference.

10. The method according to claim 8 further comprising determining an order for allocations of the resource blocks.

11. The method according to claim 8 further comprising discriminating the potentially interfering resource request depending on whether a station associated with the resource request is designated within the exclude group.

12. The method according to claim 8 further comprising assigning stations interfering each other among a group of potentially interfering stations to one of at least first and second exclude groups, and wherein the allocating of the second resource blocks to the potentially interfering resource request comprises allocating the second resource blocks to resource requests for the first exclude group with priority over resource requests for the second exclude group.

13. The method according to claim 12, wherein the allocating of the second resource blocks to the potentially interfering resource requests comprises commencing allocation of the second resource blocks to resource requests for the first exclude group from a first initial position in the resource blocks, and commencing allocation of the second resource blocks to resource requests for the second exclude group from a second initial position in the resource blocks which is far in time and/or frequency from the first initial position.

14. The method according to claim 12, further comprising sorting resource requests for each of the first and second exclude groups, and wherein the allocating of the second resource blocks to the potentially interfering resource requests comprises allocating the second resource blocks to resource requests for each exclude group in sort order.

15. A non-transitory storage medium storing computer executable instructions which, when executed by a processor, cause the processor to perform a method according to claim 8.

* * * * *